United States Patent
Ciano et al.

(10) Patent No.: US 9,703,540 B2
(45) Date of Patent: *Jul. 11, 2017

(54) DYNAMIC CONFIGURATION OF VIRTUAL APPLIANCES

(71) Applicant: International Business Machines Incorporated, Armonk, NY (US)

(72) Inventors: Giuseppe Ciano, Rome (IT); Marco De Santis, Rome (IT); Maurizio Simeoni, Rome (IT)

(73) Assignee: International Business Machines Corporation, Armonk, NY (US)

( * ) Notice: Subject to any disclaimer, the term of this patent is extended or adjusted under 35 U.S.C. 154(b) by 126 days.

This patent is subject to a terminal disclaimer.

(21) Appl. No.: 14/072,951

(22) Filed: Nov. 6, 2013

(65) Prior Publication Data
US 2014/0208316 A1    Jul. 24, 2014

(30) Foreign Application Priority Data

Nov. 7, 2012  (GB) .................................. 1220086.1

(51) Int. Cl.
G06F 9/455  (2006.01)
G06F 9/445  (2006.01)
G06F 9/48  (2006.01)

(52) U.S. Cl.
CPC ................ *G06F 8/61* (2013.01); *G06F 9/455* (2013.01); *G06F 9/4856* (2013.01)

(58) Field of Classification Search
None
See application file for complete search history.

(56) References Cited

U.S. PATENT DOCUMENTS

| 7,269,721 | B2 | 9/2007 | McCardle | |
|---|---|---|---|---|
| 7,577,722 | B1 * | 8/2009 | Khandekar et al. | 709/220 |
| 8,171,141 | B1 * | 5/2012 | Offer | G06F 9/5077 709/223 |
| 8,176,094 | B2 * | 5/2012 | Friedman | G06F 11/3664 707/803 |
| 8,601,472 | B1 * | 12/2013 | LeMahieu et al. | 718/1 |

(Continued)

FOREIGN PATENT DOCUMENTS

EP        2043320 B1    9/2009
WO   WO2012/069296 A1   5/2012

OTHER PUBLICATIONS

Cognizant Technology; "Virtual Appliances-Building, Supporting Application Faster, Better & Cheaper" Copyright 2008, (Cognizant_2008.pdf; pp. 1-6).*

(Continued)

*Primary Examiner* — Hiren Patel
(74) *Attorney, Agent, or Firm* — David J. Zwick; Gregory K. Goshorn; Greg Goshorn, P.C.

(57) ABSTRACT

A solution is proposed for deploying a virtual appliance onto a data processing system. A corresponding method comprises instantiating the virtual appliance with a basic configuration onto the data processing system, determining a value of each one of to set of environmental features of a virtual data processing environment associated with the virtual appliance, and downloading a set of local software programs corresponding to the values of at least part of the environmental features onto the virtual appliance.

14 Claims, 8 Drawing Sheets

(56) References Cited

U.S. PATENT DOCUMENTS

| | | | | |
|---|---|---|---|---|
| 8,726,275 | B2 * | 5/2014 | Ciano | G06F 9/45558 |
| | | | | 718/1 |
| 8,863,125 | B2 * | 10/2014 | Ciano | G06F 9/45558 |
| | | | | 717/174 |
| 8,868,608 | B2 * | 10/2014 | Friedman | G06F 11/3664 |
| | | | | 707/787 |
| 8,910,157 | B2 * | 12/2014 | Ciano | G06F 9/45558 |
| | | | | 717/174 |
| 9,264,306 | B2 * | 2/2016 | Ciano | H04L 41/0813 |
| 2009/0210869 | A1 * | 8/2009 | Gebhart et al. | 717/174 |
| 2009/0300057 | A1 * | 12/2009 | Friedman | G06F 11/3664 |
| 2009/0300149 | A1 * | 12/2009 | Ferris et al. | 709/222 |
| 2009/0300151 | A1 * | 12/2009 | Friedman | G06F 11/3664 |
| | | | | 709/222 |
| 2009/0300604 | A1 * | 12/2009 | Barringer | G06F 11/3664 |
| | | | | 717/178 |
| 2009/0300641 | A1 * | 12/2009 | Friedman | G06F 11/3664 |
| | | | | 718/104 |
| 2010/0106804 | A1 * | 4/2010 | He et al. | 709/219 |
| 2011/0004676 | A1 * | 1/2011 | Kawato | 709/221 |
| 2011/0265168 | A1 * | 10/2011 | Lucovsky et al. | 726/7 |
| 2012/0054736 | A1 | 3/2012 | Arcese et al. | |
| 2012/0131578 | A1 * | 5/2012 | Ciano | G06F 9/45558 |
| | | | | 718/1 |
| 2013/0091498 | A1 * | 4/2013 | Arcese | G06F 9/455 |
| | | | | 717/173 |
| 2013/0167147 | A1 * | 6/2013 | Corrie et al. | 718/1 |
| 2013/0254755 | A1 * | 9/2013 | Yousouf | G06F 8/65 |
| | | | | 717/170 |
| 2013/0275958 | A1 * | 10/2013 | Ivanov | G06F 8/61 |
| | | | | 717/174 |
| 2013/0275960 | A1 * | 10/2013 | Kirchev | G06F 8/61 |
| | | | | 717/175 |
| 2013/0332900 | A1 * | 12/2013 | Berg | G06F 8/71 |
| | | | | 717/121 |
| 2015/0106810 | A1 * | 4/2015 | Ciano | G06F 9/45533 |
| | | | | 718/1 |

OTHER PUBLICATIONS

Yee Ja et al. "Automating deployment and activation of virtual appliances for IBM AIX and Power Systems", IBM Apr. 29, 2009, (IBM_2009.pdf; pp. 1-31).*

Giuseppe Ciano et al., "Automate virtual machine discovery and self connectivity", IBM Nov. 1, 2010, (IBM_2010.pdf; pp. 1-17).*

Changhua Sun et al., "Simplifuing Service Deployment with Virtual Appliances", IEEE Internation conference on Services Computing 2008, (Sun_2008.pdf; pp. 1-8).*

German Molto et al., "A Service-Oriented Architecture for Scientific Computing on Cloud Infrastructures" 2012, (Molto_2012.pdf; pp. 1-8).*

VMware, Inc. copyright 2008; "Guide to Deploying Virtual Appliances"; VMware Studio 1.0; (VMWare_2008.pdf; pp. 1-22).*

Keahey et al., "Contextualization: Providing One-Click Virtual Clusters," NSF CSR award #527448, U.S. Dept of Energy, under contract DE-ACo2-06CH11357, 2008.

* cited by examiner

DYNAMIC CONFIGURATION OF VIRTUAL APPLIANCES

FIELD OF DISCLOSURE

The solution according to one or more embodiments of the present invention relates to the data processing field. More specifically, this solution relates to the deployment of virtual appliances.

BACKGROUND ART

Virtual appliances, or VAs, are a specific type of software appliances. In general, a software appliance is a software solution comprising a software application (i.e., one or more application programs performing a specific user task) and the required operating system, which are encapsulated in a pre-built, self-contained package; typically, the operating system is a Just Enough Operating System, or JeOS (i.e., a limited operating system specifically tailored to support the software application). Particularly, a virtual appliance is a software appliance designed to run in a virtualized environment; for this purpose, the virtual appliance comprises one or more virtual machines, or VMs (i.e., emulations by software of physical machines), each one with its operating system and application programs. The virtual appliances provide a simplified management, and allow providing corresponding turnkey software services.

The deployment of the virtual appliances (onto a data processing system) generally involves the building of corresponding software images; the software image of each virtual appliance comprises a snapshot of a mass memory providing the definition of its virtual machines with the corresponding software programs (i.e., operating system and application programs) packaged according to a predefined specification (such as the Open Virtualization Format, or OVF). Whenever a new instance of a virtual appliance is required, the software image thereof is copied and applied so as to instantiate the corresponding virtual machines with their software programs. This allows provisioning corresponding services on demand in a very fast way (for example, in a cloud environment).

Several techniques are also known for improving specific aspects of the above-described deployment process.

For example, "Contextualization: Providing One-Click Virtual Clusters, eScience, 2008, IEEE Fourth International Conference on Date of Conference: 7-12 Dec. 2008, Keahey, K., Freeman, T." discloses a technique for configuring the virtual machines (such as their IP addresses and hostnames) when they are deployed; this is based on a context broker that coordinates the exchange of application-specific contextualization information among context agents of the virtual appliances.

WO-A-2012/069296 discloses a technique for adding pre-requisite software required by an environment of the virtual appliance. For this purpose, a list of the pre-requisite software is added to a distribution package of the virtual appliance; when the virtual appliance is deployed, each pre-requisite software that is not available is retrieved from a location indicated in the same distribution package and installed only after a user has approved a corresponding license text.

EP-A-2043320 proposes adding a ticket to each virtual machine descriptor, which ticket is used to download virtual machine configuration information from a provisioning server.

US-A-2010/0042988 discloses an installation manager, which provides configuration options, scripts, and other information to a configuration agent operating in each virtual machine.

US-A-2010/0011353 discloses a technique for deploying a virtual appliance, wherein network settings of a virtualization software are changed to match a deployment configuration file of the virtual appliance.

US-A-2010/0235482 proposes modifying substantially identical virtual appliances by installing different interactive applications before their deployment.

US-A-2010/0058328 discloses a technique for differential software provisioning on virtual machines having different configurations, wherein a provisioning server interacts with a local virtual machine installation client to initiate a software provisioning process for diverse sets of virtual machines.

US-A-2009/0172662 discloses a technique for configuring virtual machines at their booting according to application and operating system files included in a corresponding virtual machine image file.

US-A-2011/0004676 discloses a technique for configuring a virtual appliance according to a setting file having attributes that are replaced by specific values stored in a configuration data database.

SUMMARY

The solution according to one or more embodiments of the present invention is based in the idea of configuring each virtual appliance according to a virtual data processing environment thereof.

Particularly, one or more aspects of the solution according to specific embodiments of the invention are set out in the independent claims and advantageous features of the same solution are set out in the dependent claims, with the wording of all the claims that is herein incorporated verbatim by reference (with any advantageous feature provided with reference to a specific aspect of the solution according to an embodiment of the invention that applies mutatis mutandis to every other aspect thereof).

More specifically, an aspect of the solution according to an embodiment of the invention provides a method for deploying a virtual appliance, wherein a set of local software programs (corresponding to the values of at least part of environmental features of a virtual data processing environment associated with the virtual appliance) are downloaded onto the virtual appliance.

A further aspect of the solution according to an embodiment of the invention provides a corresponding computer program.

A further aspect of the solution according to an embodiment of the invention provides a corresponding computer program product.

A further aspect of the solution according to an embodiment of the invention provides a corresponding system.

BRIEF DESCRIPTION OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

As the Inventors herein have realized, a problem of known deployment processes is that a very high number of software images are required to implement the different functions that may be required. Particularly, very often several software images implementing substantially the same function are provided for fitting different contingent needs. For example, the software images may simply differ for an application program (or more), which is used to connect to different external software programs offering the same function (for example, monitoring, or accounting), moreover, different versions of the same application program may be required to connect to corresponding levels of the same external software program.

The above-mentioned problem significantly increases the amount of mass memory that is required to store the software images, and the time required to move them between different repositories.

Moreover, this adversely affects the maintenance of the software images (since each maintenance operation required for a specific software program is to be replicated on several software images wherein the same software program is comprised), with a corresponding increase of the cost of their life cycle management.

Figure 1:
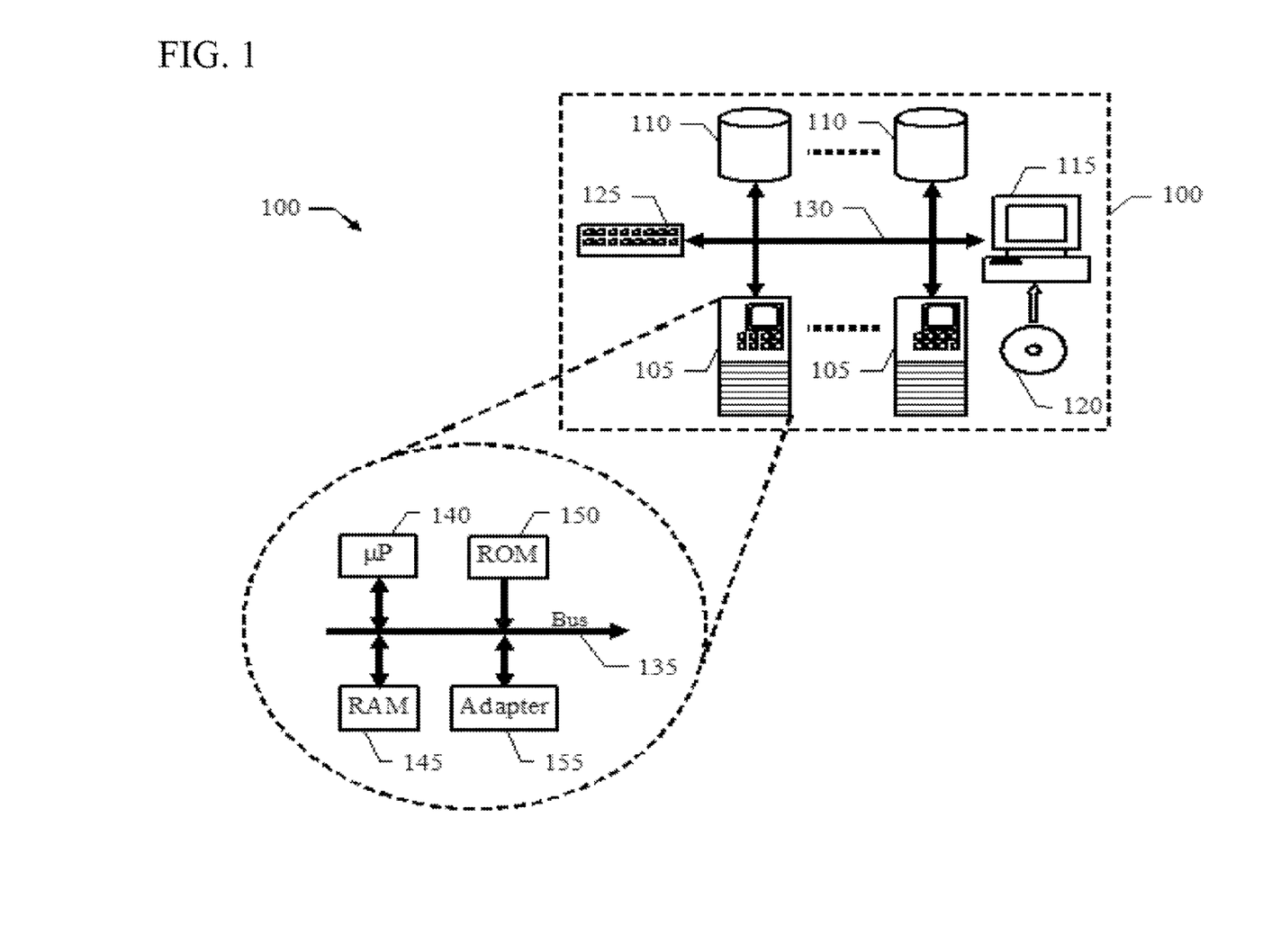
FIG. 1 shows a block diagram of a data center that may be used to practice the solution according to an embodiment of the invention.

With reference in particular to the FIG. 1, a block diagram is shown of a data center 100 that may be used to practice the solution according to an embodiment of the invention.

The data center 100 is formed by a set of processing units 105 (for example, server computers of the rack or blade type) and as set of storage units 110 (for example, hard disks of the RAID type). The data center 100 also comprises a console 115 for controlling the processing units 105 and the storage units 110 (for example, a personal computer, also provided with a drive for reading optical disks 120). A router (or switch) system 125 manages communications among the processing units 105, the storage units 110 and the console 115, and with the outside of the data center 100 (for example, through the Internet); for this purposes, the processing units 105, the storage units 110, the console 115 and the router system 125 are connected through a cabling system 130.

A generic processing unit 105 is formed by several components that are connected in parallel to a communication bus 135. In detail, a set of (one or more) microprocessors (μP) 140 controls operation of the processing unit 105; a RAM 145 is directly used as a working memory by the microprocessors 140, and a ROM 150 stores basic code for a bootstrap of the processing unit 105. Moreover, the processing unit 105 comprises a network adapter 155, which is used to connect the processing unit 105 to the cabling system 130.

Figure 2:
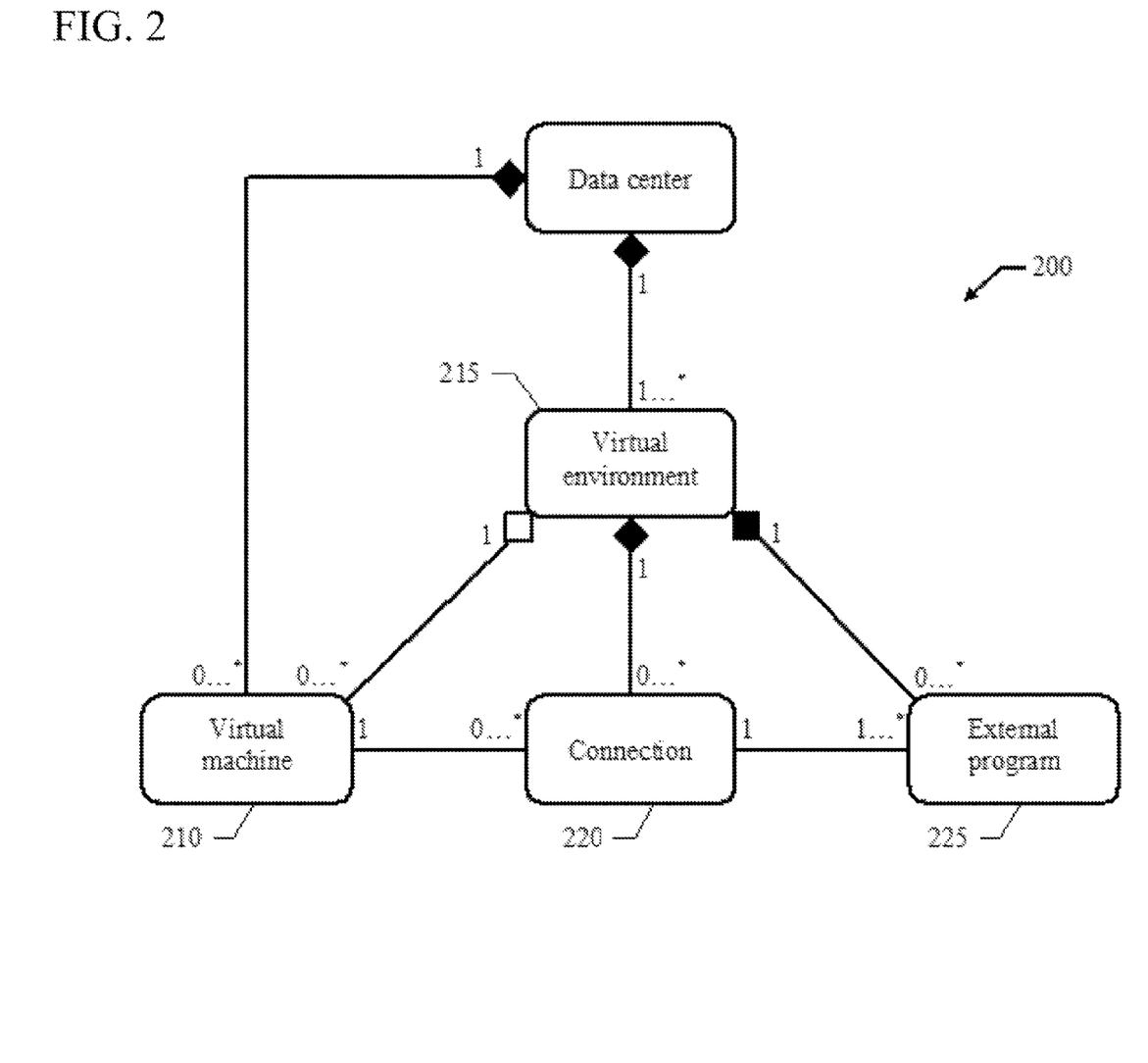
FIG. 2 shows a simplified class diagram modeling an implementation of the solution according to an embodiment of the invention.

Passing to the FIG. 2, a simplified class diagram 200 is shown modeling an implementation of the solution according to an embodiment of the invention.

Particularly, the above-described data center implements a virtual data processing infrastructure comprising a set of virtual machines (each one emulating a physical machine by software). The data center is used to deploy virtual appliances; each virtual appliance is formed by a set of (one or more) virtual machines, each one with its operating system and application programs. This is represented in the class diagram 200 by a data center stereotype 205 and to virtual machine stereotype 210, with a composition relationship from the data center stereotype 205 (one) to the virtual machine stereotype 210 (zero or more).

In the solution according to an embodiment of the invention, the data center is logically organized into different virtual data processing environments (or simply virtual environments), each one defining a specific context offering functions supporting the running of the virtual appliances (for example, monitoring and accounting). This is represented in the class diagram 200 by a virtual environment stereotype 215, with a composition relationship from the data center stereotype 205 (one) to the virtual environment stereotype 215 (one or more). For example, each virtual environment may be defined by the virtual machines belonging thereto (which implement the corresponding functions). This is represented in the class diagram 200 by an aggregation relationship from the virtual environment stereotype 215 (one) to the virtual machine stereotype 210 (zero or more).

Each virtual environment has corresponding environmental features; for example, these environmental features may be defined by connections that are mapped to software programs (hereinafter, referred to as external programs) implementing the functions offered by the virtual environment (for example, server components of distributed applications). This is represented in the class diagram 200 by a connection stereotype 220 and an external program stereotype 225, with a composition relationship from the virtual environment stereotype 215 (one) to the connection stereotype 220 (zero or more), a composition relationship from the virtual environment stereotype 215 (one) to the external program stereotype 225 (zero or more) and an association relationship from the connection stereotype 220 (one) to the external program stereotype 225 (one or more).

Each virtual appliance that is deployed onto the data center is associated with one of the virtual environments. The values of the relevant environmental features of its virtual environment are determined, so that one or more software programs (hereinafter, referred to as local programs) corresponding to these values of the environmental features (or a part thereof) are downloaded onto the virtual appliance. Particularly, in the specific example at issue, the connections of the virtual appliance are resolved into the corresponding external programs mapping them in its virtual environment; the local program required to establish the connection with each external program (for example, a client component of the same distributed application) is downloaded, installed and configured accordingly (on the virtual machines of the virtual appliance). This is represented in the class diagram 200 by an association relationship from the virtual machine stereotype (one) to the connection stereotype 220 (zero or more).

The above-described solution reduces the number of software images that are required to provide the different functions that may be required. Indeed, in this case a single software image may be provided for each function, with the several instances of the corresponding software appliance that self-adapt dynamically (at run-time) to the different virtual environments (for example, by downloading, installing and configuring corresponding local programs, which are used to connect to different external programs, or different levels thereof, implementing a same function).

As a result, the amount of mass memory that is required to store the software images and the time required to move them between different repositories are significantly reduced.

Moreover, this has a beneficial effect on the maintenance of the software images (since it limits the need of replicating each maintenance operation required for a specific software program on more software images), with a corresponding decrease of the cost of their life cycle management.

Some exemplary scenarios of application of the solution according to an embodiment of the invention are shown in the FIG. 3A-FIG. 3F.

Figure 3A:
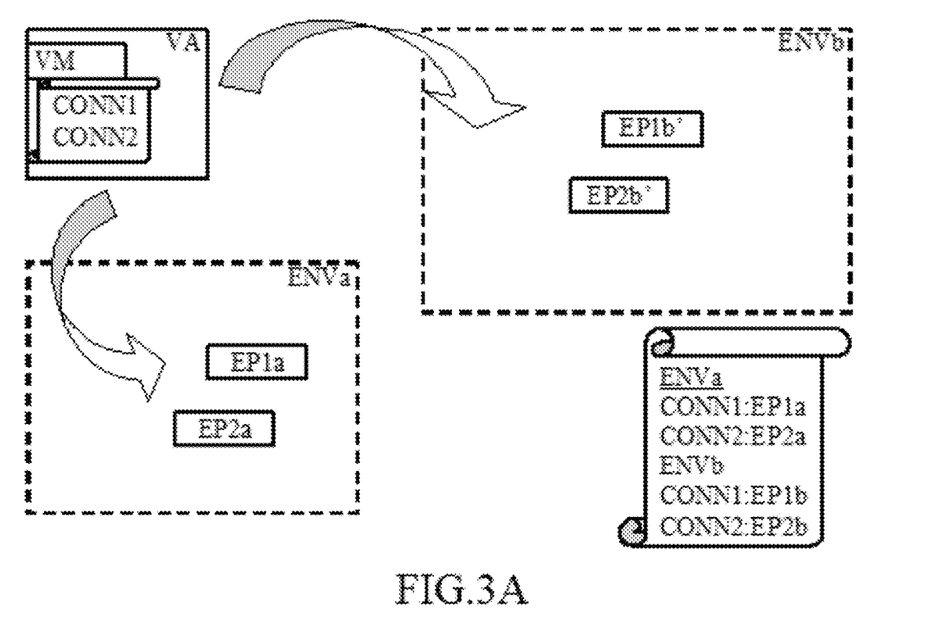
FIG. 3A-FIG. 3F show some exemplary scenarios of application of the solution according to an embodiment of the invention.

Starting from the FIG. 3A, the data center is organized into two virtual environments ENVa and ENVb. The virtual environment ENVa maps a connection CONN1 to an external program EP1a and a connection CONN2 to an external program EP2a, whereas the virtual environment ENVb maps the same connection CONN1 to another external program EP1b and the same connection CONN2 to another external program EP2b. A virtual appliance VA is deployed onto both the virtual environment ENVa and the virtual environment ENVb; the virtual appliance VA comprises a single virtual machine VM requiring the connections CONN1 and CONN2.

Figure 3B:
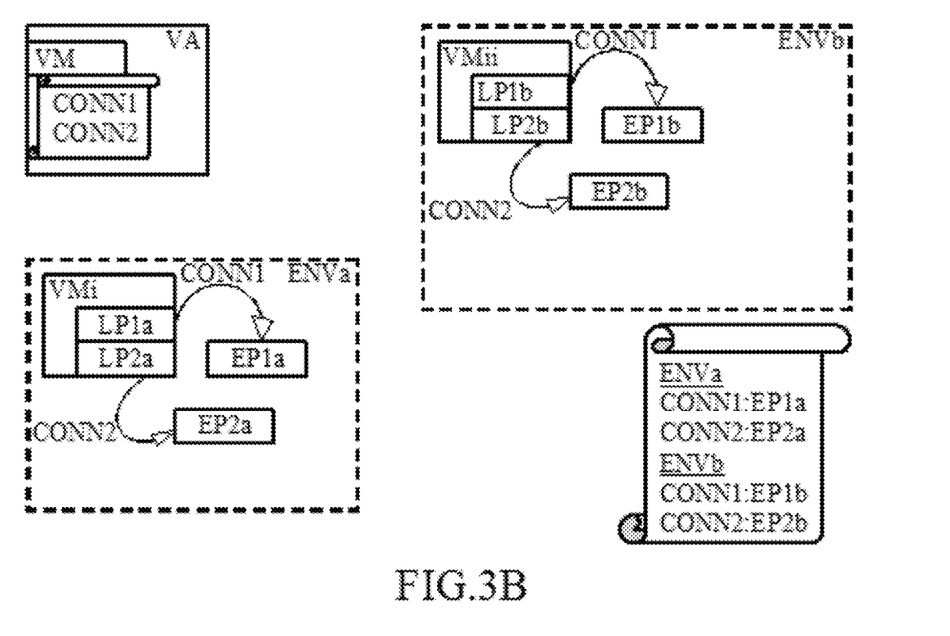

Moving to the FIG. 3B, the deployment of the virtual appliance VA onto the virtual environment ENVa creates an instance of its virtual machine (denoted with VMi), and the deployment of the virtual appliance VA onto the virtual environment ENVb creates another instance of the same virtual machine (denoted with VNii). The connections CONN1 and CONN2 are resolved into the external programs EP1a and EP2a, respectively, for the virtual machine VMi (belonging to the virtual environment ENVa), whereas the same connections CONN1 and CONN2 are resolved into the external programs EP1b and EP2b, respectively, for the virtual machine VMii (belonging to the virtual environment ENVb). Therefore, the virtual machine VMi downloads, installs and configures a local program LP1a for connecting to the external program EP1a and a local program LP2a for connecting to the external program EP2a; the virtual machine VMii instead downloads, installs and configures another local program LP1b for connecting to the external program EP1b and another local program LP2b for connecting to the external program EP2b.

In this way, the virtual machines of a same virtual appliance deployed onto different virtual environments are automatically completed with different local programs, as required to connect to the corresponding external programs.

Figure 3C:
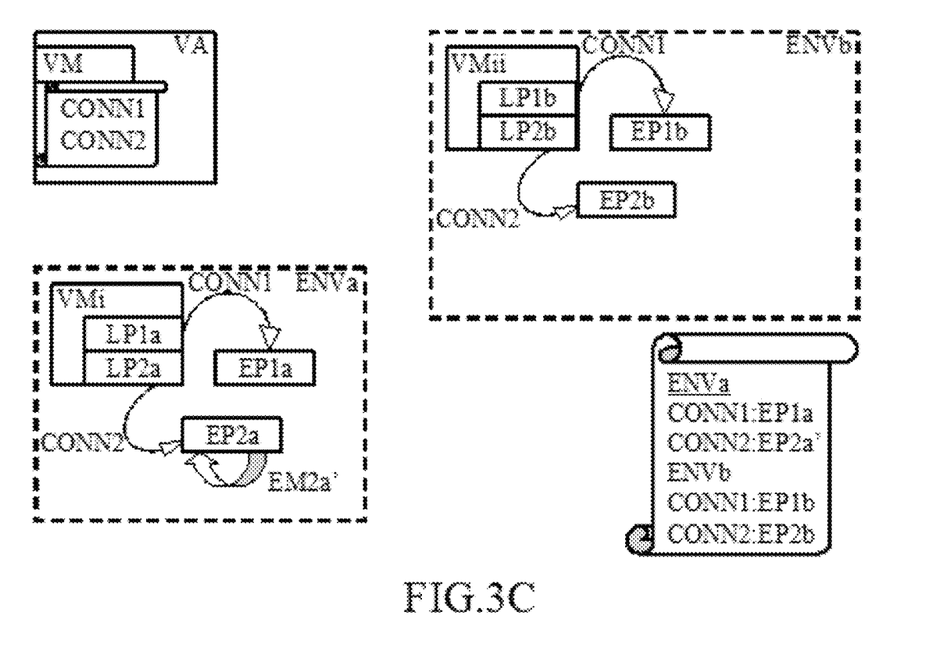

With reference now to the FIG. 3C, the external program EP2a (in the virtual environment ENVa) is upgraded to a different level (differentiated with a prime notation—i.e., EP2a').

Figure 3D:
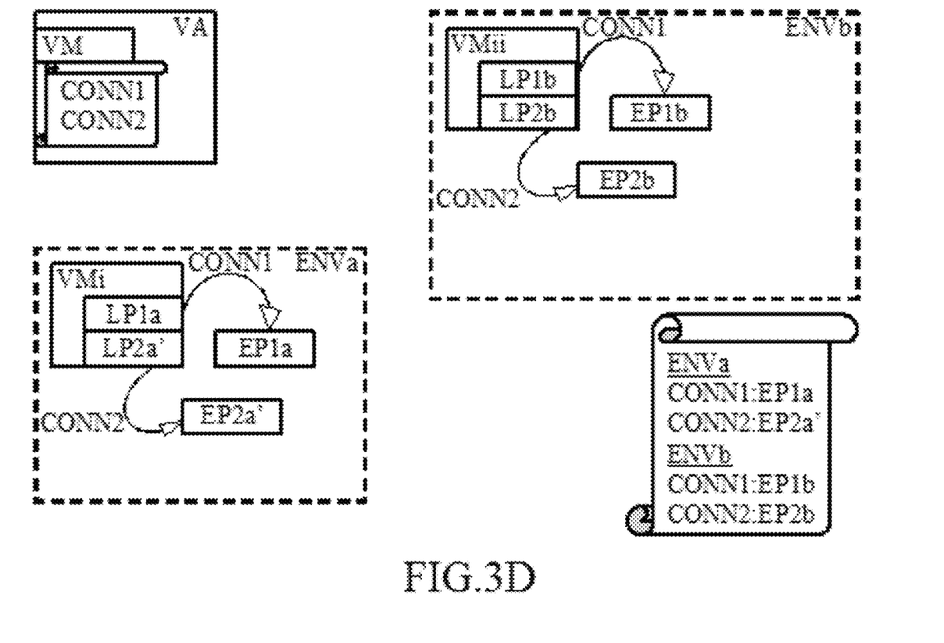

In response thereto, as shown in the FIG. 3D, virtual machine VMi accordingly upgrades the local program connected to the external program EP2a' (differentiated with a prime notation—i.e., LP2a').

In this way, the virtual machines are automatically aligned with the external programs of their virtual environments.

Figure 3E:
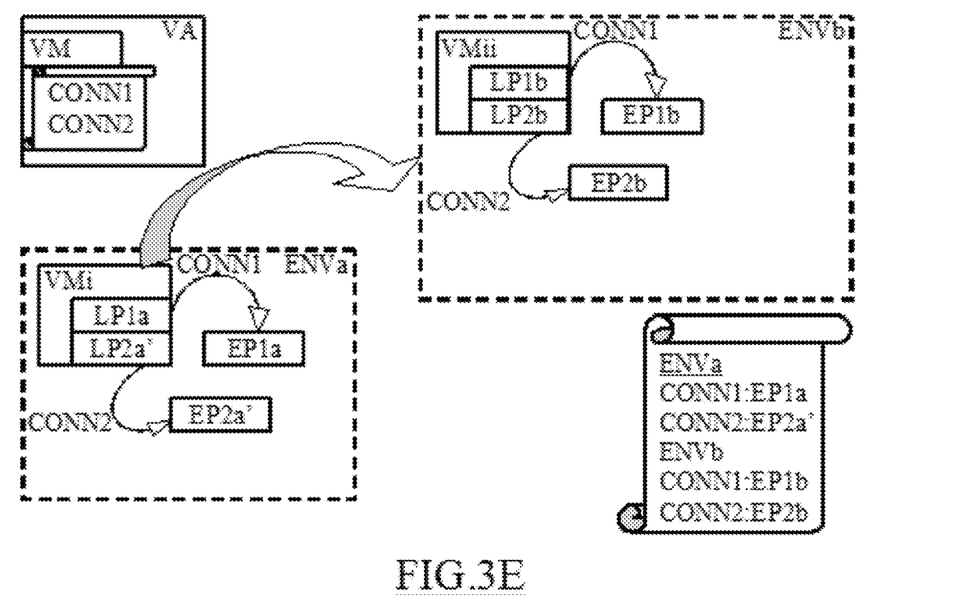

With reference instead to the FIG. 3E, the instance of the virtual appliance VA deployed on the virtual environment ENVa (i.e., the virtual machine VMi) is logically moved to the virtual environment ENVb (for example, because of load balancing reasons).

Figure 3F:
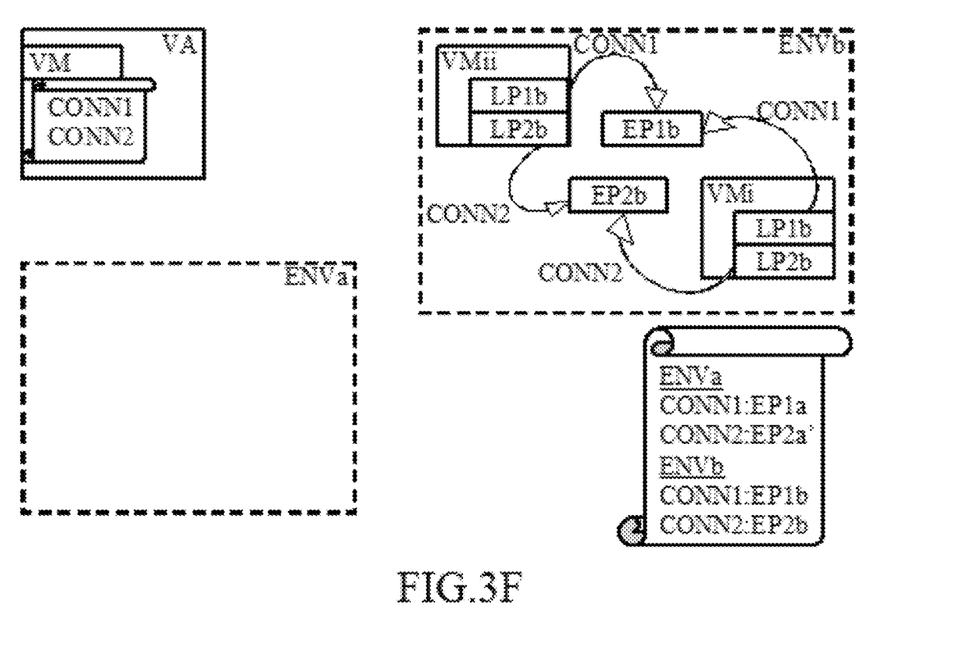

In response thereto, as shown in the FIG. 3F, the same connections CONN1 and CONN2 are now resolved into the external programs EP1b and EP2b, respectively, for the virtual machine VMi as well. Therefore, the virtual machine VMi downloads, installs and configures the local program LP1b for connecting to the external program EP1b and the local program LP2b for connecting to the external program EP2b (with the previous local programs LP1a and LP2a that are removed).

In this way, the virtual appliances may be changed by simply updating their associated virtual environments.

Figure 4:
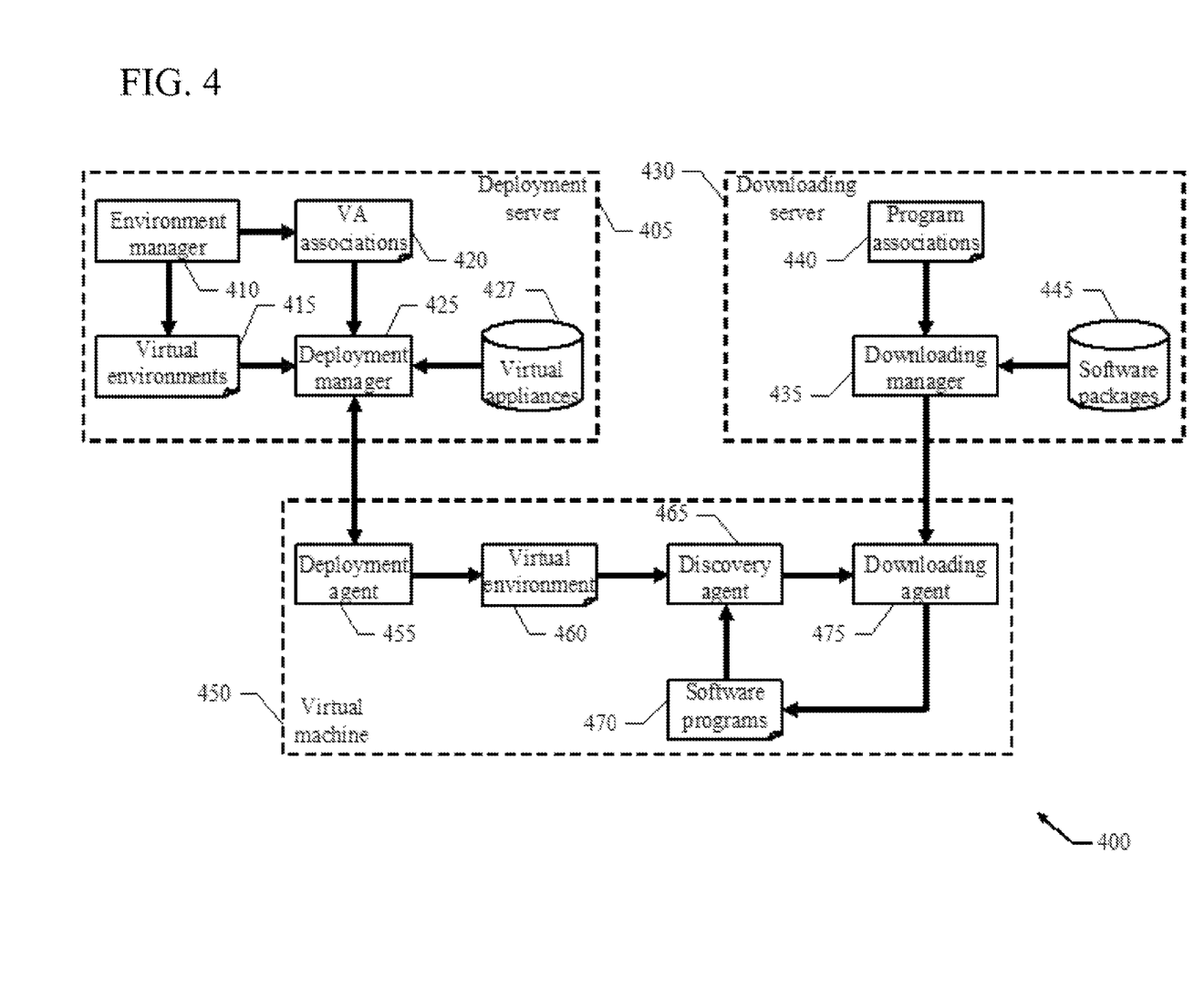
FIG. 4 shows the main software components that mat be used to implement the solution according to an embodiment of the invention.

The main software components that may be used to implement the solution according to an embodiment of the invention are shown in the FIG. 4.

These software components are denoted as a whole with the reference 400. The information (programs and data) is typically stored in the storage units of the data center and loaded (at least partially) into the working memories of its processing units when the programs are running; the programs are initially installed onto the storage units, for example, from optical disks.

Particularly, a deployment server 405 (for example, implemented by to dedicated virtual machine) runs an environment manager 410 that is used to configure the data center via a corresponding interface (for example, by a system administrator). More specifically, the environment manager 410 allows defining the virtual environments of the data center (i.e., its virtual machines with the corresponding connections mapped to their external programs); the definitions of the virtual environments are stored into a virtual environments table 415. In addition, the environment manager 410 allows associating each virtual appliance of the data center with its virtual environment, and each virtual machine of the virtual appliance with the relevant connections of this virtual environment. The associations of the virtual appliances with the corresponding virtual environments and connections are stored into a virtual appliance associations table 429.

The deployment server 405 also runs a deployment manager 425, which controls the deployment of the virtual appliances onto the data center. For this purpose, the deployment manager 425 accesses both the virtual environments table 415 and the virtual appliance associations table 420. The deployment manager 425 also accesses a virtual appliances repository 427, which stores a software image of each virtual appliance that may be deployed onto the data center (i.e., a mass memory snapshot providing the definition of its virtual machines with the corresponding software programs, for example, packaged according to the OVF specification). The software image of each virtual appliance is a template with a basic configuration, which is independent of the virtual environments wherein the virtual appliance may be deployed; this means that the software image does not comprise any local programs required by its virtual machines to connect to the corresponding external programs. The software image instead comprises a deployment agent, a discovery agent and a downloading agent for each virtual machine, which are used to configure it dynamically according to the corresponding virtual environment (as described in the following).

Moreover, a downloading server 430 (for example, implemented by another dedicated virtual machine) runs a downloading manager 435, which controls the downloading of the local programs onto the virtual machines of the data center. For this purpose, the downloading manager 435 accesses a program associations table 440 which stores an indication of the local program (or more) corresponding to each external program that may be available in the data center; the downloading manager 435 also accesses a software packages repository 445, which stores a software package for distributing each local program that may be downloaded onto the virtual machines of the data center.

Each virtual machine instantiated in the data center (only one shown in the figure, denoted with the reference 450) runs the above-mentioned deployment agent, denoted with the reference 455. The deployment agent 455 interacts with the deployment manager 425 to control the configuration of the virtual machine 450 according to its virtual environment. For this purpose, the deployment agent 455 retrieves the virtual environment associated with its virtual appliance, and the connections of this virtual environment associated with the virtual machine 450 together with their mapping to the corresponding external programs (denoted as a whole as environment information) from the deployment server 405; the deployment agent 445 stores the environment information of the virtual machine 450 into a virtual environment table 460.

The virtual machine 450 also runs the above-mentioned discovery agent, denoted with the reference 465 (for example, based on the Service Location Protocol, SLP or srvloc). The discovery agent 465 announces the external programs that are offered by the virtual machine 450 in its virtual environment (which external programs may be connected by the other virtual machines of the same virtual environment). For this purpose, the discovery agent 465 accesses the virtual environment table 460 to retrieve its virtual environment, and it accesses a software programs table 470 that stores an indication of all the software programs that are installed on the virtual machine 450. Moreover, the discovery agent 465 discovers the instances of the external programs to be connected (retrieved from the virtual environment table 460) that are actually available in its virtual environment (as announced by the discovery agents of the other virtual machines).

The virtual machine 450 also runs the above-mentioned downloading agent, denoted with the reference 475; the downloading agent 475 controls the downloading of the local programs, corresponding to the instances of the external programs discovered by the discovery agent 465, from the downloading server 430. For this purpose, the downloading agent 475 interacts with the downloading manager 435; moreover, the downloading agent 475 accesses the software programs table 470 to update it accordingly.

Figure 5A:
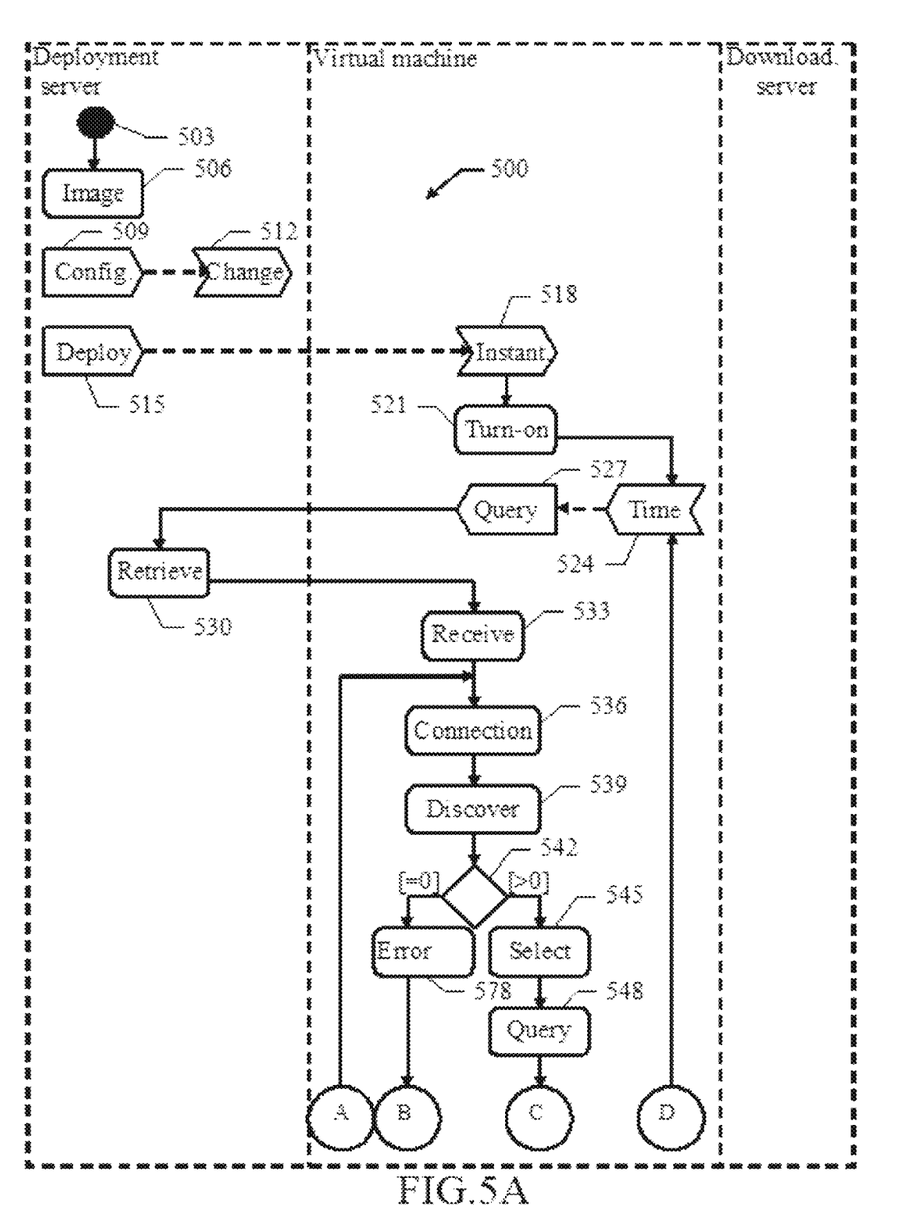
FIG. 5A-FIG. 5B show an activity diagram describing the flow of activities relating to an implementation of the solution according to an embodiment of the invention.
Figure 5B:
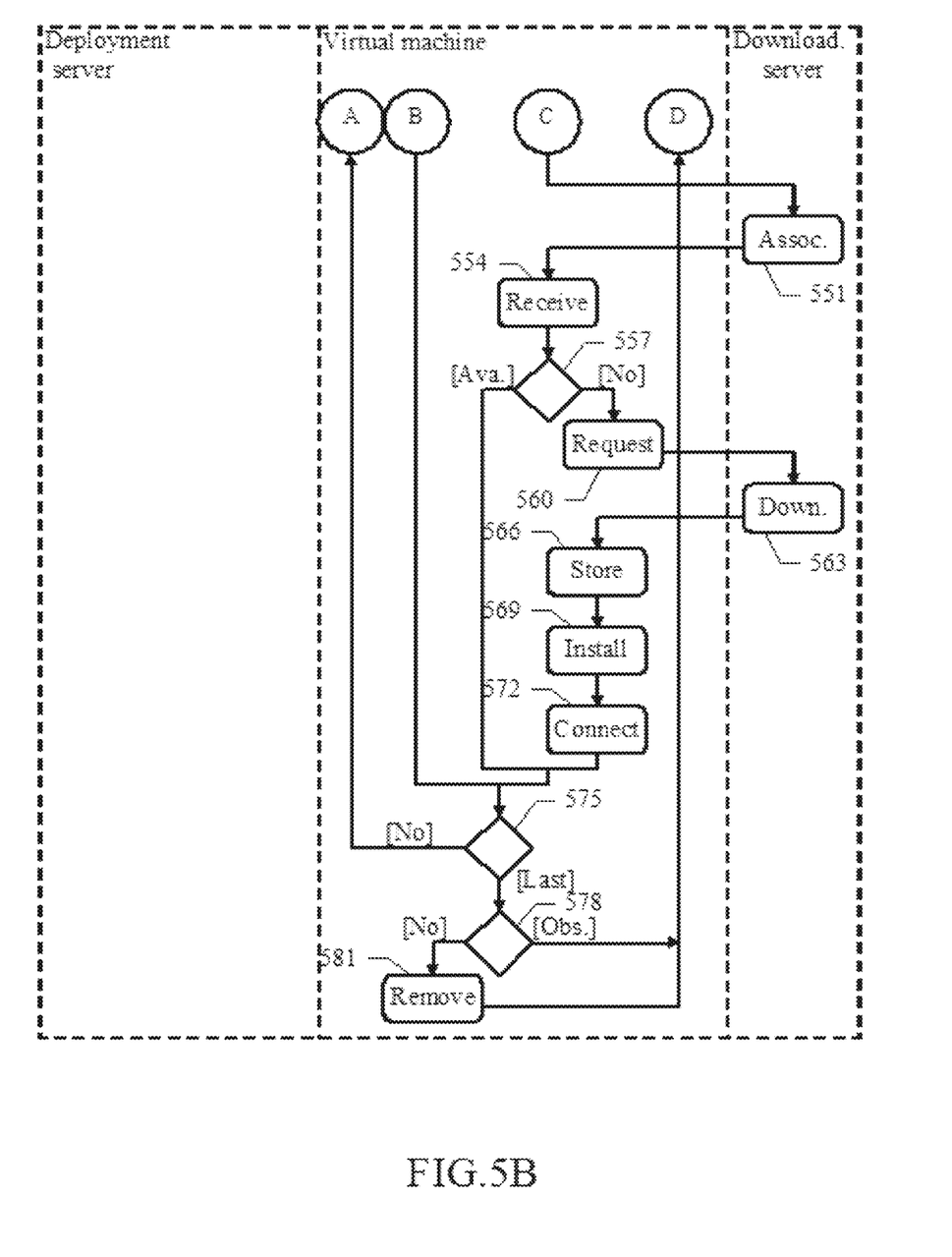

An activity diagram describing the flow of activities relating to an implementation of the solution according to an embodiment of the invention is shown in the FIG. 5A-FIG. 5B. In this respect, each block in the diagram may represent a module, segment or portion of code, which comprises one or more executable instructions for implementing the specified logical function (or more).

Particularly, the diagram represents an exemplary process that may be used to control the deployment of virtual appliances onto the above-described, data center with a method 500.

The method 500 begins at the black start circle 503, and then passes to block 506 in the swim-lane of the deployment server whenever the software image of a new virtual appliance (in its basic configuration with no local programs but with the deployment agent, the discovery agent and the downloading agent for each virtual machine) is made available for its deployment onto the data center (for example, by building it via any known composition tool).

In a completely independent way, the method 500 passes to block 509 whenever a request for configuring the data center is submitted by an authorized user (for example, the system administrator). In response thereto, the system administrator is allowed to change the configuration of the data center at block 512. Particularly, the system administrator may create new virtual environments, may delete old virtual environments, and may update the definition of existing virtual environments; particularly, for each virtual environment the system administrator may change its virtual machines, its connections and their mappings to the corresponding external programs. Moreover, the system administrator may define the associations of new virtual appliances (with its virtual environment and the corrections thereof), may delete the associations of old virtual appliances, and may update the associations of existing virtual appliances; particularly, for each virtual appliance the system administrator may change its virtual environment and the connections thereof.

In a completely independent way, the method 501) passes to block 515 whenever a request for deploying a new instance of a virtual appliance (whose software image and associations are already available) is submitted by an authorized user (for example, again the system administrator). In response thereto, a new instance of each virtual machine of the virtual appliance is created at block 518 in the corresponding swim-lane (via any known deployment tool); one or more virtual disks with the corresponding software programs (i.e., operating system and application programs, with no local programs but with the deployment agent, the discovery agent and the downloading agent) are then mounted to the virtual machine. The virtual machine is then turned-on at block 521; this causes the automatic start of its deployment agent.

The deployment agent enters a waiting condition at block 524. As soon as a predefined time-out expires (for example, immediately after the start of the deployment agent and then every 10-60 min.), the method 500 continues to block 527. In this phase, an (environment) query is submitted to the deployment server—by passing an identifier of the virtual appliance and of the virtual machine for example, extracted from the corresponding software image). In response thereto, the environment in format ion of the virtual machine is retrieved at block 530 in the swim-lane of the deployment server. Particularly, for this purpose the virtual environment associated with the virtual appliance and the connections thereof associated with the virtual machine are determined; the corresponding portion of the definition of the virtual environment, which maps each connection of the virtual machine to the corresponding external program, is then extracted.

Returning to the swim-lane of the virtual machine, at block 533 the corresponding environment information is received from the configuration server and stored into the virtual machine. A loop is then performed for each connection of the virtual machine (as indicated in its environment information). The loop begins at block 536, wherein a (current) connection is selected (for example, starting from the first one). Continuing to block 539, any instances of the external program mapping the connection that are available in the virtual environment of the virtual appliance are discovered. For example, in the SLP a (discovery) query is broadcast for searching all the services, in the same scope of the virtual appliance (defined by its virtual environment), with a corresponding abstract service type (defined by the external program), combined with a query for an attribute indicating the level of the instance of the external program. In response thereto, the virtual machine receives the URL (Uniform Resource Locator) of any other virtual machine in the same virtual environment that runs an instance of the external program, together with the value of the attribute indicating its level (in the form of a name/value pair).

The flow of activity then branches at block 542 according to the number of instances of the external program that have been discovered, if one or more instances of the external program have been discovered, the method 500 descends into block 545. In this phase, one of the instances of the external program is selected, if necessary (for example, giving priority to the instance currently associated with the external program mapping the connection, if any, or otherwise preferring the instance meeting a predefined criterion—such as the first one, the one at the highest level or the one running on the virtual machine with the lowest workload). A (downloading) query is then submitted at block 548 to the downloading server (by passing an identifier of the selected external program with its level). In response thereto, this level of the external program is associated with the corresponding local program (at the same level) at block 551 in the swim-lane of the downloading server.

Returning to the swim-lane of the virtual machine, at block 554 an indication of the local program corresponding to the level of the external program (together with information for its downloading—for example, the URL of the corresponding software package) is received from the downloading server. A test is then made at block 557 to verify whether the local program is available on the virtual machine. If not, a corresponding downloading request is submitted at block 560 to the downloading server (by passing the URL of its software package). In response thereto, the software package of the local program is retrieved and downloaded onto the virtual machine at block 563 in the swim-lane of the downloading server (via any known software distribution tool).

Returning to the swim-lane of the virtual machine, at block 566 the software package of the local program is received and stored into the virtual machine. Continuing to block 569, the software package of the local program is applied onto the virtual machine so as to install it thereon. The local program is then configured at block 572, so as to connect to the other virtual machine wherein the corresponding external program is available (as indicated by its URL).

The method 500 then continues to block 575; the same point is also reached directly from the block 557 if the local program is already available on the virtual machine (since no further action is required). In this phase, a test is made to verify whether the last connection of the virtual machine has been processed. If not, the method 500 returns to the block 536 to repeat the same operations on a next connection.

With reference again to the block 542, if no instance of the external program has been discovered (within a predefined time-out), an error condition is entered at block 578, since the virtual machine cannot be connected to the external program. In this phase the error may be logged and notified to the deployment server; in any case, the method 500 continues to the block 575 directly (to process any possible next connection). As a result, the virtual machine continually attempts connecting to this external program (at each next expiration of the corresponding time-out), until it becomes available in the virtual environment (or until a maximum delay is reached); in this way, the virtual machines configure correctly independently of their deployment order.

Once all the connections of the virtual machine have been processed, the above-described loop is exit by descending from the block 575 into block 578. At this point, a test is made to verify whether any local program installed on the virtual machine is become obsolete; for example, this may happen when the corresponding external program has been upgraded to a newer level or the corresponding virtual appliance has been moved to another virtual environment (as indicate by a comparison between a current version of the local environment information and a previous version thereof). If no obsolete local program has been found, the method 500 directly returns to the block 524 waiting for a next expiration of the corresponding time-out (since no action has to be performed). Conversely, the flow of activity passes from the block 578 to block 581, wherein each obsolete local program is removed from the virtual machine (for example, by disinstalling it and/or deleting, the corresponding software package). In this case as well, the method 500 then returns to the block 524 (waiting for a next expiration of the corresponding time-out).

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e. with possible further variable involved), and the term a/an should be intended as one or more items (unless expressly indicated otherwise).

For example, an embodiment of the present invention provides a method for deploying a virtual appliance onto a data processing system. The method comprises the following steps. The virtual appliance is instantiated with a basic configuration onto the data processing system. A value is determined of each one of a set of (one or more) environmental features of a virtual data processing environment associated with the virtual appliance. A set of (one or more) local software programs corresponding to the values of at least part of the environmental features is downloaded onto the virtual appliance.

However, the method may be applied to any virtual appliance in the broadest meaning of the term (i.e., comprising any type and number of virtual machines, each one with any type of operating system and any type and number of application programs); the virtual appliance may be deployed onto any data processing system (see below). The environmental features may be of any type and number (see below). The virtual data processing environment may be defined in any way (for example, by different and/or alternative characteristics—such as network connections), and it may be associated with the virtual appliance in any way (see below). The local software programs may be of any type and number (see below); moreover, the local software programs may be determined from the values of the environmental features in any way (for example, from all the environment features or only from pan of them, with the remaining environmental features that are used for other purposes—such as for configuring the virtual appliance). The local software programs may be downloaded in any way (for example, from the Internet).

In an embodiment of the invention, the step of downloading a set of local software programs includes installing each local software program onto the virtual appliance.

However, some local software programs may be simply stored into the virtual appliance without requiring any additional operation.

In an embodiment of the invention, the virtual appliance in the basic configuration comprises a deployment agent. The method further comprises the step of running the deployment agent in response to the instantiation of the virtual appliance; the deployment agent causes the determination of the values of the environmental features and the downloading of the local software programs.

However, a basic implementation wherein these operations are controlled remotely (even without any deployment agent) is not excluded.

In an embodiment of the invention, the step of determining a value of each one of a set of environmental features includes receiving the value of each environmental feature from a deployment server.

However, the deployment server may be implemented in any way (for example, in the Internet); in any case, a less dynamic implementation wherein the environmental features are defined in a descriptor that is deployed together with the virtual appliance is feasible.

In an embodiment of the invention, the step of receiving the value of each environmental feature from a deployment server includes the following operations. An environment query is submitted to the deployment server; the environment query includes an indication of the virtual appliance. The value of each environmental feature is received from the deployment server in response to the environment query.

However, the environmental features may also be provided to the virtual appliance in push mode.

In an embodiment of the invention, the method further comprises the steps of repeating the step of determining the value of each environmental feature, and repeating the step of downloading the local software programs corresponding to the values of at least part of the environmental features in response to any change thereof.

However, any number and type of changes of the environment features may be monitored (for example, a change in the associated virtual environment, its definition, its connections, their mappings, the instances of the external software programs, the associated local software programs, or any combination thereof), and these changes may be monitored with any timing and in any way (either in pull mode or in push mode); in any case, a basic implementation wherein the above-described operations are performed only once when the virtual appliance is deployed in not excluded.

In an embodiment of the invention, the method further comprises the step of removing each local software program corresponding to a previous value of an environmental feature in response to the change thereof.

However, this operation may be performed at any time (for example, periodically), or it may also be omitted at all (for example, when the virtual appliances have a very short useful life).

In an embodiment of the invention, each one of said at least part of the environmental features comprises an indication of a connection to an external software program. The step of determining a value of each one of a set of environmental features includes the following operations. The virtual data processing environment associated with the virtual appliance is determined. Any instance is discovered of each external software program available in the virtual data processing environment. The local software programs corresponding to a selected instance of each external software program are determined.

However, the connections may be of any number and type (for example, each one to multiple external software programs), and the external software programs may be of any type (for example, peer modules, client modules, web services, and the like). The instances of each external software program available in the virtual data processing environment may be discovered in any way (for example, by accessing a shared registry). The steps of determining the virtual data processing environment and/or the local software programs corresponding to a selected instance of each external software program may be performed in any way (see below).

In an embodiment of the invention, the step of discovering any instance of each eternal software program available in the virtual data processing environment includes discovering a level of each external software program.

However, the instances of the external software programs may be defined in any way—for example, by their version, release or editions (such as basic or full).

In an embodiment of the invention, the step of downloading a set of local software programs includes configuring each local software; program for connecting to the corresponding external software program.

However, some local software programs may also connect automatically to the corresponding external software programs (without any additional configuration operation).

In an embodiment of the invention, the step of determining the virtual data processing environment includes receiving an indication of the virtual data processing environment in response to the environment query.

However, in this case as well the virtual data processing environment may be indicated in the descriptor that is deployed together with the virtual appliance.

In an embodiment of the invention, the step of determining the local software programs corresponding to a selected instance of each external software program includes the following operations. A downloading query is submitted to a downloading server; the downloading query includes an indication of the instance of the external software program. An indication of the local software programs is received from the downloading, server in response to the downloading query.

However, the local software programs may be determined in any way (for example, by accessing a shared catalogue).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

Another embodiment of the invention provides a computer program comprising code means for causing a data processing system to perform the steps of the above-described methods when the computer program is executed on the data processing system.

Another embodiment of the invention provides a computer program product comprising a non-transitory computer readable medium embodying a computer program, the computer program comprising code means directly loadable into a working, memory of a data processing system thereby configuring the data processing system to perform the same method.

However, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having, one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Another embodiment of the invention provides a system, which comprises means configured for performing the steps of the same methods as above.

However, the system may be implemented in any way (for example, with a distributed architecture based on local, wide area, global, cellular or satellite network, and exploiting any type of wired and/or wireless connections) in any case, the system may comprise similar elements (such as cache memories temporarily storing the programs or parts thereof), and it may be replaced by any code execution entity, either based on a physical machine or a virtual machine, or with a combination of multiple entities (such as a multi-tier architecture, a grid computing infrastructure, and the like).

Generally, similar considerations apply if the system has a different structure or comprises equivalent components, or it has other operative characteristics in any case, every component thereof may be separated into more elements, or two or more components may be combined together into a single element; moreover, each component may be replicated to support the execution of the corresponding operations in parallel. It is also pointed out that (unless specified otherwise) any interaction between different components generally does not need to be continuous, and it may be either direct or indirect through one or more intermediaries.

We claim:

1. An apparatus, comprising:
 a data processing system;
 a non-transitory, computer readable memory coupled to the data processing system; and
 logic, stored on the computer-readable memory and executed on the data processing system, for:
  instantiating a first virtual appliance and a second virtual appliance, both with a basic configuration, onto the data processing system,
  determining, in response to the instantiating, a value of a first environmental feature of a virtual data processing environment associated with the first virtual appliance;
  correlating the first environmental feature with a second environmental feature defined in a descriptor deployed with the first virtual appliance to identify a first software program;
  determining, in response to the instantiating, a value of a third environmental feature of a second virtual data processing environment associated with the second virtual appliance;
  correlating the third environmental feature with the second environmental feature defined in a descriptor deployed with the second virtual appliance to identify a second software program, wherein the first and second software programs are different software programs;
  downloading the first software program into the first virtual processing environment; and
  downloading a second software program into the second virtual processing environment.

2. The apparatus of claim 1, wherein the logic for downloading the first software program comprises logic for installing the fi software program onto the first virtual appliance.

3. The apparatus of claim 1, wherein the first virtual appliance in the basic configuration comprises a deployment agent, the logic further comprising logic for running the deployment agent in response to the instantiation of the first virtual appliance, the deployment agent causing the determination of the value of the first environmental feature and the downloading of the first software program.

4. The apparatus of claim 1, wherein the logic for determining the value of the second environmental comprises logic for receiving the value of the second environmental feature from a deployment server.

5. The apparatus of claim 1, wherein the logic for receiving the value of the first environmental feature from a deployment server comprises logic for:
 submitting an environment query to the deployment server, the environment query including an indication of the first virtual appliance, and
 receiving the value of the first environmental feature from the deployment server in response to the environment query.

6. The apparatus of claim from 1, the logic further comprising:
 determining the value of a fourth environmental feature, and
 downloading a third software programs corresponding to a value of the fourth environmental feature.

7. The apparatus of claim 6, the logic further comprising removing a software program corresponding to a previous value of the fourth environmental feature.

8. A computer programming product, comprising:
 a non-transitory, computer readable memory; and
 logic, stored on the non-transitory, computer readable memory for execution on a processor, for:
  instantiating a first virtual appliance and a second virtual appliance, both with a basic configuration, onto the data processing system,
  determining, in response to the instantiating, a value of a first environmental feature of a virtual data processing environment associated with the first virtual appliance;
  correlating the first environmental feature with a second environmental feature defined in a descriptor deployed with the first virtual appliance to identify a first software program;
  determining, in response to the instantiating, a value of a third environmental feature of a second virtual data processing environment associated with the second virtual appliance;
  correlating the third environmental feature with the second environmental feature defined in a descriptor deployed with the second virtual appliance to identify a second software program, wherein the first and second software programs are different software programs;
  downloading the first software program into the first virtual processing environment; and
  downloading a second software program into the second virtual processing environment.

9. The computer programming product of claim 8, wherein the logic for downloading the first software program comprises logic for installing the first software program onto the ft virtual appliance.

10. The computer programming product of claim 8, wherein the first virtual appliance in the basic configuration comprises a deployment agent, the logic further comprising logic for running the deployment agent in response to the instantiation of the first virtual appliance, the deployment agent causing the determination of the values of the first environmental feature and the downloading of the first software program.

11. The computer programming product of claim 8, wherein the logic for determining a value of the second environmental feature comprises logic for receiving the value of the second environmental feature from a deployment server.

12. The computer programming product of claim 8, wherein the logic for receiving the value of the first environmental feature from a deployment server comprises logic for:
 submitting an environment query to the deployment server, the environment query including an indication of the first virtual appliance, and
 receiving the value of the first environmental feature from the deployment server in response to the environment query.

13. The computer programming product of claim from 8, further comprising:
 determining the value of a fourth environmental feature, and
 downloading a third software programs corresponding to a value of the fourth environmental feature.

14. The computer programming product of claim 13, further comprising removing a software program corresponding to a previous value of the fourth environmental feature.

* * * * *